(12) United States Patent
Kennedy

(10) Patent No.: US 7,034,410 B2
(45) Date of Patent: Apr. 25, 2006

(54) COMPACT AUXILIARY POWER GENERATOR

(76) Inventor: Gino Kennedy, 1743 Holly Oaks Lake Rd. West, Jacksonville, FL (US) 32225

( * ) Notice: Subject to any disclaimer, the term of this patent is extended or adjusted under 35 U.S.C. 154(b) by 17 days.

(21) Appl. No.: 10/756,951

(22) Filed: Jan. 13, 2004

(65) Prior Publication Data

US 2004/0145185 A1 Jul. 29, 2004

Related U.S. Application Data

(63) Continuation-in-part of application No. 09/945,186, filed on Aug. 31, 2001, now Pat. No. 6,756,693, which is a continuation-in-part of application No. 09/603,725, filed on Jun. 23, 2000, now Pat. No. 6,677,684.

(51) Int. Cl.
*F02B 63/44* (2006.01)
(52) U.S. Cl. ................ 290/1 A; 290/1 B; 290/1 R
(58) Field of Classification Search ............ 290/1 A, 290/1 R, 1 B
See application file for complete search history.

(56) References Cited

U.S. PATENT DOCUMENTS

| | | | |
|---|---|---|---|
| 422,886 A | 3/1890 | Shea | |
| 2,662,988 A | 12/1953 | McKim | |
| 2,789,234 A * | 4/1957 | Lambert et al. | ............ 290/1 R |
| 4,074,786 A | 2/1978 | Joubert | |
| 4,097,012 A | 6/1978 | McIntyre | |
| 4,441,684 A | 4/1984 | Credle, Jr. | |
| 4,540,888 A | 9/1985 | Drewry et al. | |
| 4,548,164 A | 10/1985 | Ylonen et al. | |
| 4,651,066 A | 3/1987 | Gritter et al. | |
| 4,687,945 A | 8/1987 | Ebeling | |
| 4,698,975 A | 10/1987 | Tsukamoto et al. | |
| 4,728,017 A | 3/1988 | Mullican | |
| 4,733,750 A | 3/1988 | Poirier et al. | |
| 4,871,922 A | 10/1989 | Heinrich et al. | |
| 4,896,734 A | 1/1990 | Horiuchi et al. | |
| 5,035,397 A | 7/1991 | Yamada | |
| 5,040,493 A | 8/1991 | Gajewski et al. | |
| 5,097,165 A | 3/1992 | Mashino et al. | |
| 5,188,414 A | 2/1993 | Burnham et al. | |
| 5,333,678 A * | 8/1994 | Mellum et al. | ................ 156/42 |
| 5,473,208 A | 12/1995 | Stihi | |
| 5,593,167 A | 1/1997 | Barnhardt et al. | |
| 5,642,702 A | 7/1997 | Kouchi et al. | |
| 5,686,773 A | 11/1997 | Sakakibara et al. | |
| 5,765,805 A | 6/1998 | Kennedy | |
| 5,847,470 A | 12/1998 | Mitchell | |
| 5,907,970 A | 6/1999 | Havlovick et al. | |
| 5,908,011 A | 6/1999 | Stauffer et al. | |
| 5,909,075 A | 6/1999 | Heimark | |
| 5,914,551 A | 6/1999 | Kern et al. | |

(Continued)

FOREIGN PATENT DOCUMENTS

JP 11-148348 9/1999

*Primary Examiner*—Darren Schuberg
*Assistant Examiner*—Iraj A. Mohandesi
(74) *Attorney, Agent, or Firm*—McHale & Slavin, P.A.

(57) ABSTRACT

A low profile engine/generator set has dimensions suitable for being placed in an enclosure hung on the frame of a vehicle. The enclosure may serve as a step for ingress and egress from the vehicle. To reduce the space required for a generator and engine to fit within such an enclosure, the components are rigidly coupled together with a base plate. The base plate serves as the floor of the enclosure.

16 Claims, 3 Drawing Sheets

U.S. PATENT DOCUMENTS

| | | |
|---|---|---|
| 5,944,298 A | 8/1999 | Koike |
| 5,964,492 A | 10/1999 | Lyon |
| 6,047,942 A | 4/2000 | Kennedy |
| 6,098,950 A | 8/2000 | Zupan et al. |
| 6,099,070 A | 8/2000 | Yocum |
| 6,158,415 A | 12/2000 | Ichikawa et al. |
| 6,257,543 B1 | 7/2001 | Huelsmann |
| 6,313,543 B1 | 11/2001 | Frank |
| 6,331,740 B1 | 12/2001 | Morohoshi et al. |
| 6,340,191 B1 | 1/2002 | Brady |
| 6,414,399 B1 | 7/2002 | Gianchi |
| 6,661,107 B1 * | 12/2003 | Higuchi et al. ............. 290/1 A |

* cited by examiner

COMPACT AUXILIARY POWER GENERATOR

RELATED APPLICATIONS

This application is a continuation-in-part of U.S. patent application Ser. No. 09/945,186, now U.S. Pat. No. 6,756,693 which is a continuation-in-part of U.S. patent application Ser. No. 09/603,725, now U.S. Pat. No. 6,677,684.

FIELD OF THE INVENTION

This invention relates to auxiliary power generators and, in particular, to a compact auxiliary power generator assembly coupled directly to a step box for use in mobile applications, such as large trucks.

BACKGROUND OF THE INVENTION

Semi-truck tractor trailers frequently employ the use of an auxiliary generator to meet electrical requirements when the main engine is not running. Semi-truck tractor trailers having a "bunk" or "sleeper" are common and most interstate fuel stations permit the drivers of such vehicles to sleep in their cab. The passenger area of the truck may include convenience items such as a television, VCR, refrigerator, air conditioner, coffee maker, even a microwave oven. While such items may run on direct current provided by an engine mounted alternator, or even alternating current by use of an inverter, the truck engine must be running. Idling laws now prohibit the running of the main engine for prolonged periods of time. However, the time and cost savings of keeping the driver near the vehicle while at rest are obvious and ancillary benefits include security as the operator does not leave the vehicle unattended. A problem with the use of auxiliary generators is directed to size, weight, and placement. The size of an auxiliary generator is critical for if the overall dimensions are too large, there will be insufficient areas on a truck for which to place the auxiliary generator. For instance, it is not possible to place an auxiliary engine within the existing main engine compartment. Placement of an auxiliary engine on the frame rails is a known alternative.

Generators also have a problem with vibration caused by misalignment. By mounting both units on a baseplate the misalignment of the belt drive between the engine and generator is prevented.

The Applicant is a well known assembler of engine/generators and has been awarded patents for compact generators including U.S. Pat. Nos. 6,047,942 and 5,765,805 for disclosing the use of a combination engine/generator that is not only light in weight, but of a unique space saving configuration.

Thus what is found lacking in the art is a low profile generator set that minimizes space, weight, vibration and includes an installation mount integrating the generator set with a vehicle.

DESCRIPTION OF THE PRIOR ART

An integral engine generator set that may be used in this invention is disclosed in U.S. Pat. No. 5,765,805 to G. W. Kennedy, the inventor here. The disclosure of this patent is incorporated herein by reference.

The integral engine generator set described in the patent utilizes a bracket interposed between the engine and generator for direct coupling of the components. The inspection plate of the engine is replaced by the bracket and the generator is bolted to the other side of the bracket. The bracket eliminates the need for a common baseplate and a belt tensioner. The engine and bracket may have isolation mounts for support or the engine, alone, may be mounted to the vehicle.

Base plates for motors are old and well known in the prior art as exemplified by U.S. Pat. No. 2,662,988. Also, mounting brackets are conventional as shown by Credle, Jr. in U.S. Pat. No. 4,441,684.

SUMMARY OF THE INVENTION

The instant invention is a combination engine generator set combined with a support housing that is incorporated into the design of the vehicle in which it is mounted.

The instant invention is an engine/generator assembly designed specifically for tractor and semi-trailer applications. The assembly is positionable within an enclosure by employing a horizontally disposed engine providing a low profile and securing the assembly within an enclosure to the chassis of the truck, in a similar manner as an auxiliary tool box.

An objective of this invention is to provide an engine/generator set with a very low profile fixed within an existing compartment of a vehicle.

Another objective of this invention is to provide an engine/generator set that is positionable within a conventional low profile step securable to a truck chassis.

Still another objective of this invention is to provide an engine/generator set with an air conditioner compressor having total dimensions less than the low profile enclosure.

Another objective of this invention is to provide a low profile mount for a engine generator set that minimizes vibration in the support vehicle.

Yet another objective of this invention is to provide a low profile mount which permits easy access to the components of the engine generator set.

Yet still another objective of this invention is to provide a generator enclosure that further operates as a step.

A further objective of this invention is to provide a base plate integrating the motor and generator and forming an integral construction with a storage box.

A further objective of this invention is to provide a engine, generator, base plate combination to be attached to a storage box.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objectives and features thereof.

DETAILED DESCRIPTION OF THE INVENTION

Figure 1:
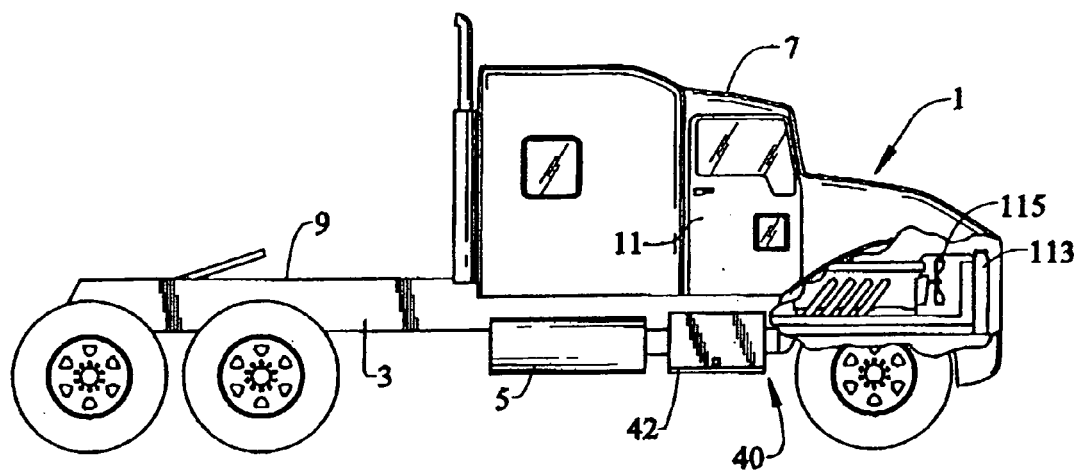
FIG. 1 is a perspective, partially in section, of the low profile generator mount installed on a large truck.

Now referring to FIG. 1 which shows an illustration of a large truck 1 having a chassis 3, or frame, in which an external fuel tank 5 is typically mounted between the cab 7 and the truck bed or trailer, not shown, attachable to the fifth wheel assembly 9. The prime mover engine has a cooling system which includes a fan 115 and a radiator 113. The size and height of the truck normally requires steps located beneath the door 11 to gain entry to the cab 7. In some truck designs, the steps are faired into the external fuel tanks for aesthetics and aerodynamics. In other designs the tanks are behind the doors of the cab and the steps are separate.

Figure 3:
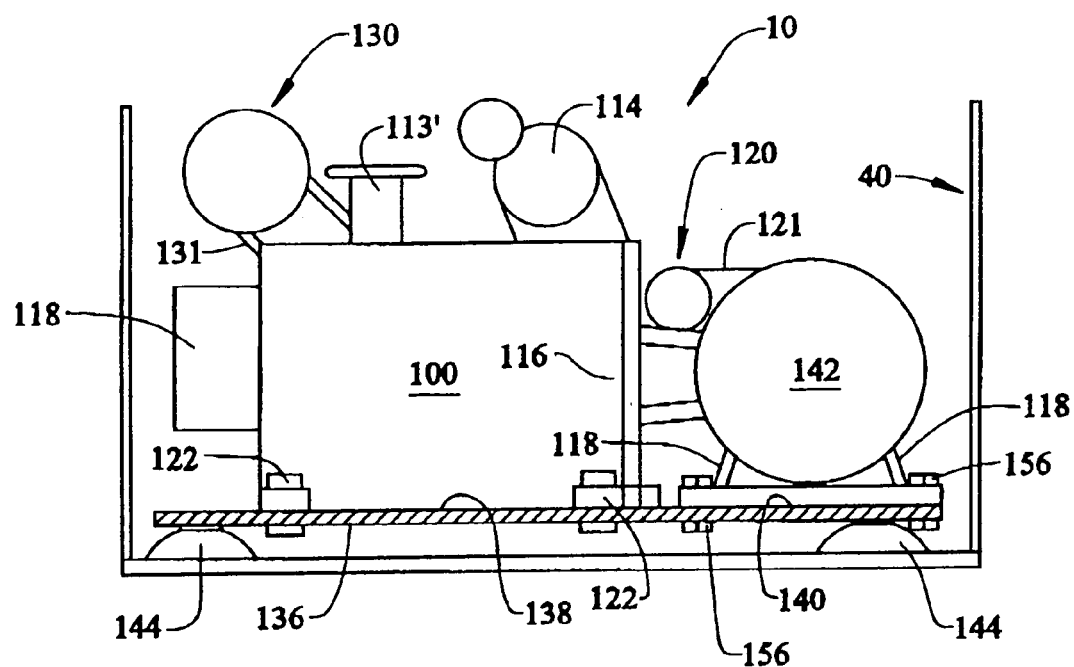
FIG. 3 is a partial cross section and diagram of the engine generator set mounted on a base plate in a step box.

In the first embodiment, the generator set 10 of the instant invention is incorporated within a box 40 or step structure of the truck as shown in FIG. 3. The step structure 44 is made of metal attached to the truck frame 3, by bracket 112, and extends below the frame. The side walls 46 and 48 and the back wall 51 form an integral portion of the storage box 40 which is attached to the truck frame by a bracket 112 on the back wall 51 of the box 40. The bracket 112 may be attached to the frame by bolts, rivets, or other fastening devices and methods.

Figure 5:
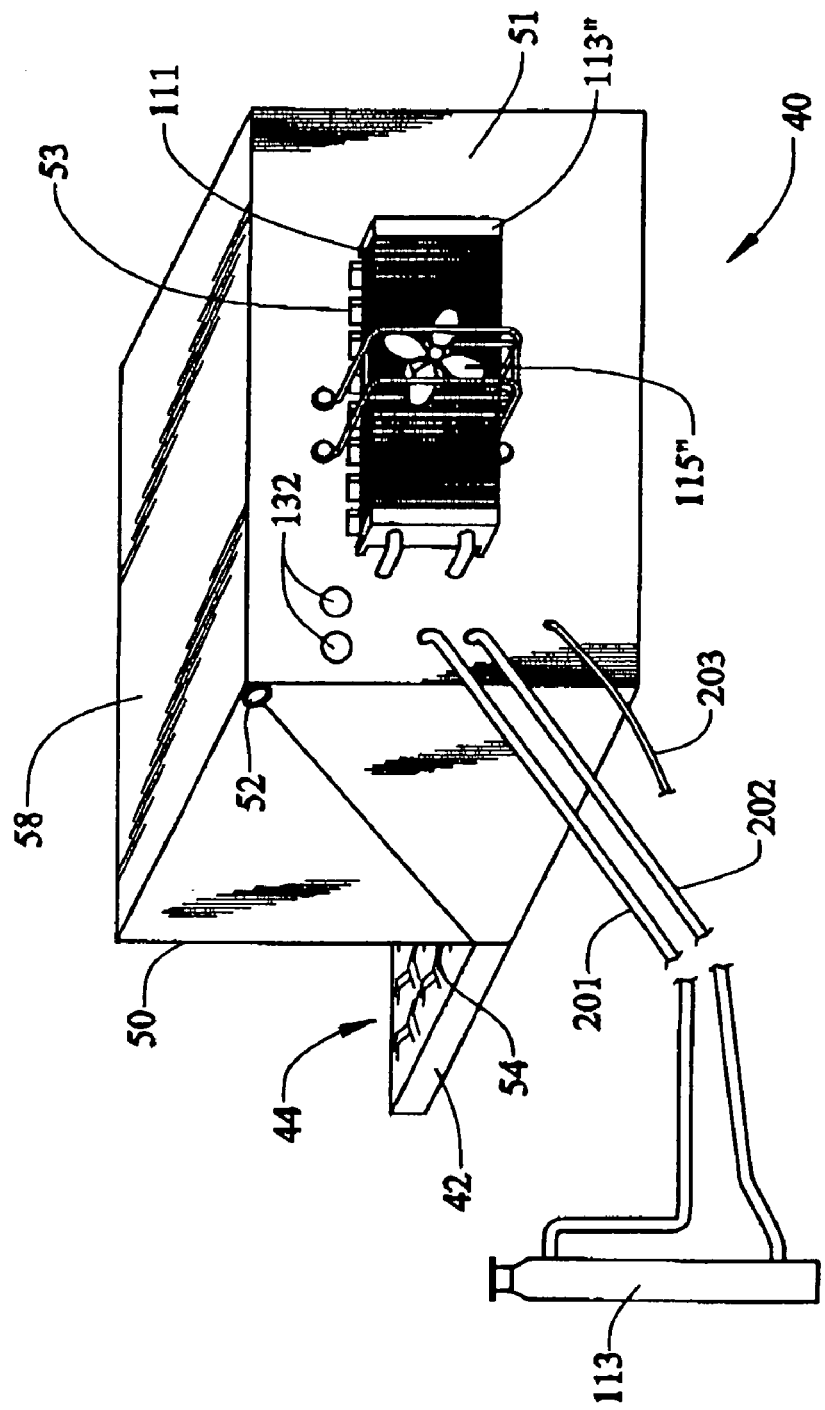
FIG. 5 is a prospective of the rear of the truck step.

The step structure 44 has a lower step 42, extending horizontally closest to the ground, with a non-slip surface extending between side walls 46 and 48 at each end of the step. The step 42 may be attached by the brackets 45 or made from a single piece of metal further forming a platform for mounting of the generator within the storage box, as shown in FIG. 5. The step 42 extends outwardly from the enclosure sufficiently to provide a safe footing.

The step 42 may be a solid planar metal sheet with a non-slip tread formed in the upper surface or an open mesh material 43. In one embodiment, the step 42 is made with the base plate 117 and the step 42 integral with the bottom of the box 40. The base plate 117, the step 42 and the bottom of the box 40 may be one piece or an assembly connected by welding, bolts or other conventional connectors.

Figure 2:
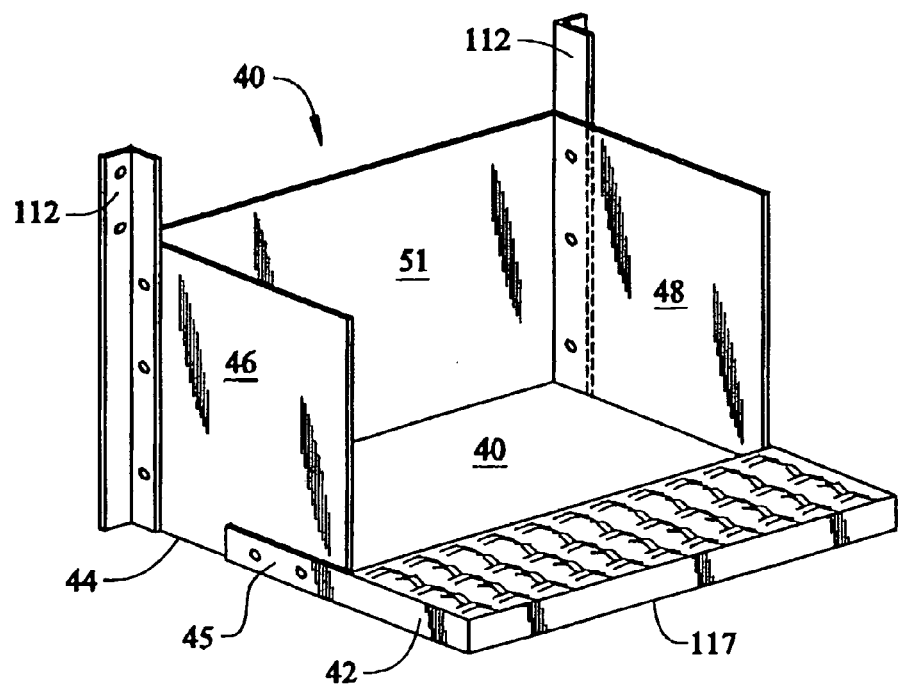
FIG. 2 is a perspective of the step box with mounting structure.

A vertical cover 50 is rotatably attached to the brackets by a hinge 52 at the upper edge. The cover forms the front wall of the enclosure. The lower edge 54 of the cover 50 may have a latch mechanism to cooperate with the step 42 to releasably hold the cover 50 in place in the closed position. When closed, the cover forms the vertical riser between the lower step and the upper step. The height of the vertical riser is limited to the distance an average person can step, e.g. approximately 14 to 17 inches. The hinged cover 50 provides access to the generator set while providing protection for both the machinery and the operators. The upper surface 58 of the cover 50 may form a second step if necessary to provide egress into the cab 11. Another fixed vertical cover opposite the front wall forms the back wall 51 of the enclosure. The wall 51 has perforations 53 for ventilation. In one embodiment (not shown), the hinge may be at the lower edge of the side wall and the latch near the upper step. The hinge may be omitted and the cover 50 may be completely removed, as shown in FIG. 2. In the preferred embodiment, the planar horizontal surface 58 of the enclosure is attached to the side walls 60 and 62 to form the upper step.

In the embodiment shown in FIG. 3, a crank case plate 136 is constructed from steel or aluminum plate or other suitable material having a thickness of about ⅜ inch with a first side surface 138 securable to the engine 116 and a second side surface 140 available for securing the engine and generator 142. The crank case plate 136 may be through-bolted to the engine and generator or otherwise fixed to provide a rigid engine/generator set. A set of isolation mounts 144 is secured to the plate 136 providing a structure for mounting on the bottom wall inside the storage box 40.

The low profile generator set has the approximate dimensions of 28 inches length, 17 inches height and 16 inches deep. The preferred engine 100 is a one cylinder liquid cooled Kubota diesel engine turning a generator of 3.5 kilowatts capacity at 120 volts and 30 amps. In another embodiment having a height approximately 14 inches, the engine radiator 113" and cooling fan 115' are located outside the enclosure and connected to the engine by the requisite hoses and wires, as shown in FIG. 5. The fan is located between the radiator and the enclosure wall. In this position, the fan serves the dual purpose of extracting heated air from the enclosure and providing air flow across the radiator. Preferably, the radiator and fan are attached to the perforated back wall 51 of the box 40 for protection of the components and safety considerations. As another alternative, the exterior mounted radiator and fan, shown in FIG. 5, are replaced and the cooling system of the engine generator set are connected by hoses 201, 202 to the radiator 113 of the prime mover engine. The prime mover fan motor is electrically connected to the generator set by cable 203 to provide power for the fan 115.

In FIG. 3, there is shown a conventional diesel engine 100, such as manufactured by the Kubota Corporation, having a horizontally disposed cylinder and an integral generator 142 located on opposite sides of the crank case 116. The generator may be belt driven in which case there is an tensioner 120 for maintaining tension in belt 121 between engine 100 and generator 142. Other drive forms, such as timing belt, chain or shaft may be used. This orientation is necessary to accommodate the internal space requirements existing in the box 40. In this installation, the piston reciprocates parallel to the step surface.

The engine is self contained having a radiator 113', starter 114, crank case 116, air cleaner 118, and fuel injections system.

The engine generator set has provision for an optional, add-on air conditioner compressor 130 for use with smaller prime mover engines. The air conditioner compressor 130 may be secured directly to the base plate 138 or the engine 100 or the generator or a combination. The compressor is powered by belt 131 or chain or shaft from the engine output. The over-all dimensions of the engine/generator set and compressor is such to fit within the enclosure, as shown in FIG. 3. The drive mechanism may be integrated with the generator drive or separate from it. The storage box 40 has apertures 132, shown in FIG. 5, for connecting the air conditioner compressor with the air conditioning system of the truck.

A base plate 138 supports both the engine 100 and the generator 142 in fixed relationship. The engine is directly connected to the base plate through an mounts 122. A mounting bracket 118 is mounted on the base plate 117 by isolation mounts 144. Generator 142 has brackets 118 connected to the base plate 138 by bolts 156. The engine and generator each may have additional isolation mounts connected to the base plate. The base plate 138 provides a platform supporting the engine generator set in fixed positions and serves as a structural member for the box.

Figure 4:
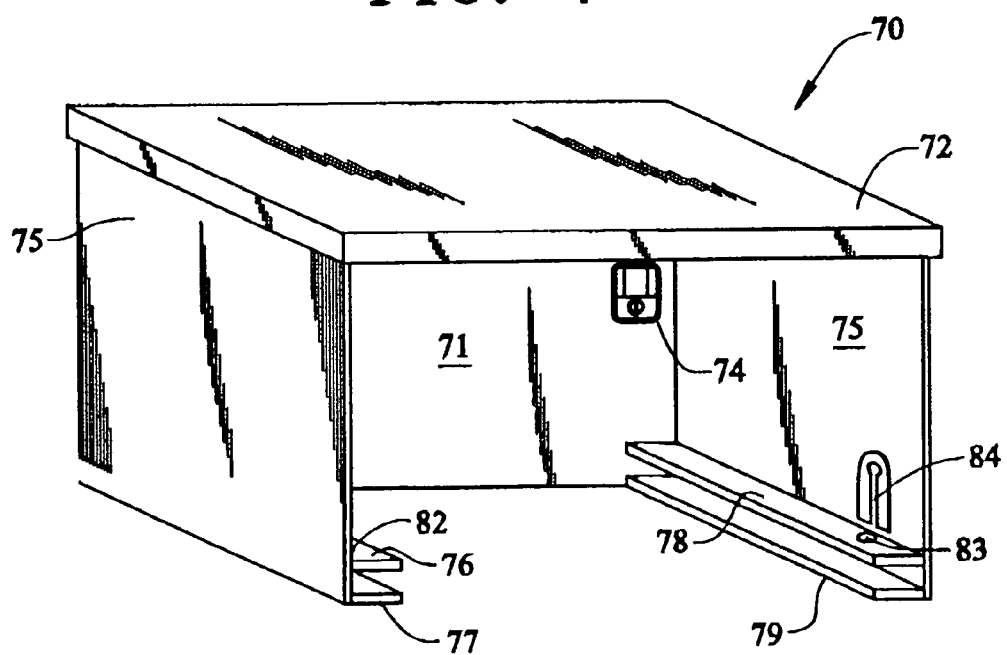
FIG. 4 is a perspective of another step box with alternative mounting for the engine generator set.

FIG. 4 sets forth another embodiment wherein the generator set may be mounted in a box 70 having a removable top 72, a back side wall 71, opposite end walls 73, 75. The front side wall is omitted to show the interior. The lock 74 is shown as attached to the top 72 and cooperates with a lock mechanism on the front wall to secure the box 70. The box 70 is of a size of a conventional storage box found on trucks and may, or may not, operate as a step. The top 72 may be removed to gain access to the generator set and secured closed by a latch mechanism 74 to releasably connect the top to the remainder of the box. In both embodiments of the enclosure, there is adequate ventilation to permit dissipation of heat and engine air intake.

The box 70 has no bottom but each end wall 73, 75 terminates in a set of guide rails 76, 77 and 78, 79 extending along the length of each end wall and connected to the back side wall 71. The engine generator set, such as shown in FIG. 3, may be placed in the box 70 by sliding into the guide rails with the opposite lateral edges 151, 152 of the base plate 138 between the guide rails 76, 77 and 78, 79. The front wall of the box 70 is attached to the forward edge of the base plate such that a complete enclosure results from the assembly. The guide rails have locking devices to hold the base plate in place. As shown, the base plate has apertures 80 and 81. The guide rails 76 and 78 also have apertures 82 and 83. The apertures 80 and 81 will register with apertures 82 and 83, respectively, when the base plate is properly stowed. On each end wall, a reciprocating locking pin 84 is mounted above the apertures 82 and 83. In the locked position, the pins 84 will penetrate apertures 80,82 and 81, 83 to prevent movement of the base plate. Of course other locking mechanisms may be used, such as detents and spring loaded pins or ball or end closures for the guide rails. Further, the side walls may have locking devices in addition to or in place of the mechanism on the end walls to hold the base plate in position. The front wall will also serve as a stop for the base plate when it is locked with the latch 74. While this embodiment is shown with a top opening box, it may be fabricated as a front opening box, as shown in FIG. 5.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

The invention claimed is:

1. An apparatus for securement of a low profile auxiliary generator to large vehicles, said large vehicle having a frame, said apparatus comprising an enclosure having interconnected opposite vertical walls, said vertical walls having a height of about 17 inches forming front and back walls, opposite end walls, and a top parallel to a floor, a low profile engine having a height of about 17 inches coupled to a generator set fixed in said enclosure, said engine having further defined as a liquid cooled internal combustion engine connected to said generator by a base plate, said base plate interconnected with said floor, said engine having at least one cylinder horizontally disposed and positioned parallel to said floor for turning said generator to produce electricity, whereby said auxiliary generator provides 120 VAC for use in said vehicle and said enclosure may be used as a foot step for ingress and egress to said vehicle.

2. An apparatus according to claim 1 wherein said engine/generator set is connected to a plurality of isolation mounts to reduce vibration, said isolation mounts located between said engine/generator set and said floor.

3. An apparatus according to claim 1 wherein said floor and said base plate are a one piece construction connected with said end walls.

4. An apparatus according to claim 1 wherein said floor has an integral step extending beyond said side walls.

5. An apparatus according to claim 3 wherein said floor has an integral step extending beyond said end walls.

6. An apparatus according to claim 1 wherein said enclosure includes a hinge pivotally connecting adjacent interconnected vertical walls to provide access to said enclosure.

7. An apparatus according to claim 2 wherein said enclosure includes a hinge pivotally connecting adjacent interconnected vertical walls to provide access to said enclosure.

8. An apparatus according to claim 3 wherein said enclosure includes a hinge pivotally connecting adjacent interconnected vertical walls to provide access to said enclosure.

9. An apparatus according to claim 4 wherein said enclosure includes a hinge pivotally connecting adjacent interconnected vertical walls to provide access to said enclosure.

10. An apparatus according to claim 1 wherein said liquid cooled engine has a remotely mounted radiator and associated fan.

11. An apparatus according to claim 1 wherein one of said interconnected vertical walls is removably attached to adjacent interconnected vertical walls.

12. An apparatus according to claim 1 wherein an air conditioner compressor is operatively connected to said engine, said compressor located within said enclosure.

13. An apparatus for securement of a low profile auxiliary generator to large vehicles having a frame, said apparatus functibning as an auxiliary engine/generator set enclosure when mounted on said frame, said enclosure comprising opposite interconnected vertical walls having a height of about 17 inches, said vertical walls forming front and back walls, opposite end walls, and a top parallel to the floor, said enclosure having a floor perpendicular to said vertical walls removably connected to said end walls, said engine/generator set fixed on said floor, said engine having at least one cylinder horizontally disposed and positioned parallel to said floor for turning said generator to produce electricity, whereby said auxiliary generator provides 120 VAC for use in said vehicle and said enclosure may be used as a foot step for ingress and egress to said vehicle.

14. An apparatus according to claim 13 wherein said set is connected to isolation mounts to reduce vibration, said isolation mounts fixed to said floor.

15. An apparatus according to claim 13 wherein a hinge couples to said opposite vertical end walls along said vertical side wall and said top whereby operation of said hinge provides access to said enclosure.

16. An apparatus according to claim 13 wherein said auxiliary engine/generator set includes an air conditioner compressor operatively connected thereto and located within said enclosure.

\* \* \* \* \*